United States Patent
Ahn et al.

(10) Patent No.: US 10,085,244 B2
(45) Date of Patent: Sep. 25, 2018

(54) METHOD FOR GUARANTEEING OPERATION OF CONTROL MESSAGE IN WIRELESS COMMUNICATION SYSTEM AND DEVICE FOR SAME

(71) Applicant: LG ELECTRONICS INC., Seoul (KR)

(72) Inventors: Hongbeom Ahn, Seoul (KR); Seongyun Kim, Seoul (KR); Seungmyeong Jeong, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/517,020

(22) PCT Filed: Jun. 29, 2015

(86) PCT No.: PCT/KR2015/006631
§ 371 (c)(1),
(2) Date: Apr. 5, 2017

(87) PCT Pub. No.: WO2016/068442
PCT Pub. Date: May 6, 2016

(65) Prior Publication Data
US 2017/0311303 A1    Oct. 26, 2017

Related U.S. Application Data

(60) Provisional application No. 62/068,765, filed on Oct. 27, 2014, provisional application No. 62/072,444, filed on Oct. 30, 2014.

(51) Int. Cl.
| | |
|---|---|
| *H04W 72/04* | (2009.01) |
| *H04W 4/00* | (2018.01) |
| *H04W 4/70* | (2018.01) |

(52) U.S. Cl.
CPC ....... *H04W 72/0406* (2013.01); *H04W 4/005* (2013.01); *H04W 4/70* (2018.02)

(58) Field of Classification Search
CPC .... H04W 72/0406; H04W 4/005; H04W 4/70
See application file for complete search history.

(56) References Cited

U.S. PATENT DOCUMENTS

| | | | | |
|---|---|---|---|---|
| 2013/0219064 A1* | 8/2013 | Zhang | ............... | H04W 4/00 709/225 |
| 2013/0294283 A1* | 11/2013 | Van Phan | ........... | H04W 4/00 370/252 |
| 2014/0233473 A1* | 8/2014 | Lu | .................... | H04W 4/70 370/329 |

FOREIGN PATENT DOCUMENTS

| | | | |
|---|---|---|---|
| WO | WO 2013/176425 A1 | 11/2013 | |
| WO | WO 2014/129802 A1 | 8/2014 | |

OTHER PUBLICATIONS

ETSI, "Machine-to-Machine communications (M2M); Functional architecture," ETSI TS 102 690 V2.1.1, Oct. 18, 2013, pp. 1-332.

* cited by examiner

*Primary Examiner* — Jianye Wu
(74) *Attorney, Agent, or Firm* — Birch, Stewart, Kolasch & Birch, LLP

(57) ABSTRACT

Provided is a method for guaranteeing the processing of a control operation in a wireless communication system, and the method is performed by a first machine-to-machine (M2M)/Internet of Things (IoT) device and can comprise the steps of: transmitting, to a third M2M/IoT device, a resource generation request for delivering a control message for directing a control operation of a second M2M/IoT device, wherein the resource generation request includes the contents of the control message, an indicator requesting a processing guarantee of the control operation or an identifier of the resource generation request; receiving a resource generation response to the resource generation request from the third M2M/IoT device; receiving a control result notification including a processing result of the control operation according to the indicator from the third M2M/IoT device, wherein the control result notification includes the identifier of the resource generation request; and checking whether the contents of the control message match the contents of the control result notification.

20 Claims, 15 Drawing Sheets

FIG. 10
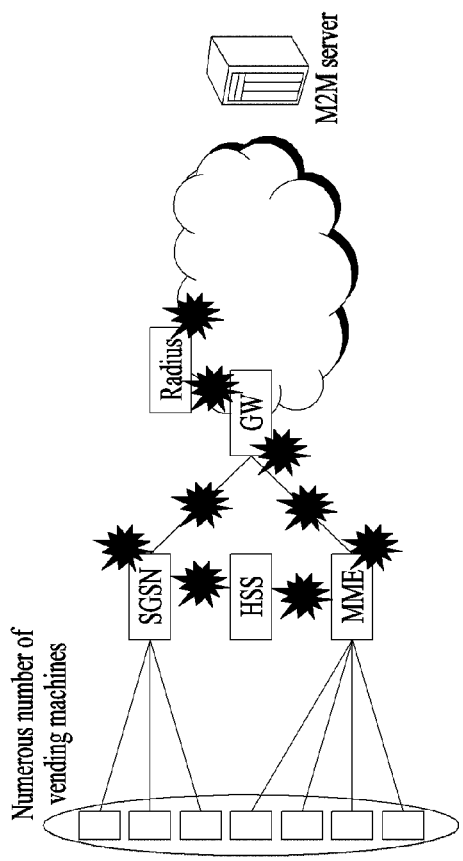
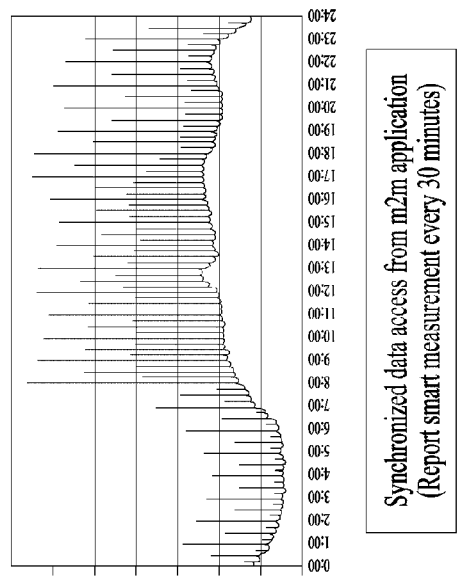

US 10,085,244 B2

METHOD FOR GUARANTEEING OPERATION OF CONTROL MESSAGE IN WIRELESS COMMUNICATION SYSTEM AND DEVICE FOR SAME

CROSS REFERENCE TO RELATED APPLICATIONS

This application is the National Phase of PCT International Application No. PCT/KR2015/006631, filed on Jun. 29, 2015, which claims priority under 35 U.S.C. 119(e) to U.S. Provisional Application No. 62/068,765, filed on Oct. 27, 2014 and No. 62/072,444, filed on Oct. 30, 2014, all of which are hereby expressly incorporated by reference into the present application.

TECHNICAL FIELD

The present invention relates to a method and apparatus for guaranteeing an operation of a control message in a wireless communication system.

BACKGROUND ART

Recently, as a society based on ubiquitous information has been formed, machine to machine (M2M) or Internet of Things (IoT) communication technology has attracted attention. Many standard development organizations (SDOs) such as TIA, ATIS, ETSI, and oneM2M/IoT have conducted research into M2M/IoT communication technology. In an M2M/IoT environment, communication between various M2M/IoT related applications (Network Application/Gateway Application/Device Application) is created and entities that manage M2M/IoT platform or framework (e.g., common service entity and an application of a network side (e.g., Network Application) may be different.

The M2M/IoT system supports a resource-based service. Accordingly, a control operation of a specific M2M/IoT device is also be performed by changing a resource related thereto or an attribute value at a lower level.

However, the resource-based control operation does not ensure that a resource indicating a result of the control operation or an attribute value thereof is not the same as an actual result of the control operation. For example, when control for changing a status of a specific M2M/IoT device is requested, the resource indicating the state of the specific M2M/IoT device and the actual status of the specific M2M/IoT device do not necessarily correspond.

Accordingly, there is a need for a method of ensuring correspondence between a resource related to control of a specific M2M/IoT device in an M2M/IoT system and corresponding control.

DISCLOSURE

Technical Problem

An object of the present invention devised to solve the problem lies in a method and apparatus for changing schedule information.

It is to be understood that both the foregoing general description and the following detailed description of the present invention are exemplary and explanatory and are intended to provide further explanation of the invention as claimed.

Technical Solution

The object of the present invention can be achieved by providing a method for ensuring processing of a control operation in a wireless communication system, the method being performed by a first machine to machine (M2M)/Internet of Things (IoT) device and including transmitting a resource creation request for transmitting a control message instructing a control operation of a second M2M/IoT device to a third M2M/IoT device, the resource creation request including content of the control message, an indicator for requesting for ensuring processing of the control operation, or an identifier of the resource creation request, receiving a resource creation response in response to the resource creation request from the third M2M/IoT device, receiving control result notification including a result of processing of the control operation according to the indicator from the third M2M/IoT device, the control result notification including the identifier of the resource creation request, and checking whether the content of the control message and content of the control result notification are the same.

Additionally or alternatively, the indicator may trigger creation of a subscription resource for enabling a notification of a change in resource related to the control operation in order to ensure processing of the control operation.

Additionally or alternatively, the method may further include applying the content of the control result notification to a status of the first M2M/IoT device when the content of the control message and the content of the control result notification are the same.

Additionally or alternatively, the method may further include retransmitting the resource creation request to the third M2M/IoT device when the content of the control message and the content of the control result notification are not the same.

In another aspect of the present invention, provided herein is a method for ensuring processing of a control operation in a wireless communication system, the method being performed by a first machine to machine (M2M)/Internet of Things (IoT) device and including receiving a creation request of a resource (hereinafter, referred to as "transfer resource") for transmitting a control message instructing a control operation of a second M2M/IoT device from a third M2M/IoT device, the resource creation request including content of the control message, an indicator for requesting for ensuring of processing of the control operation, or an identifier of the resource creation request, creating the transfer resource according to the resource creation request, transmitting a resource creation response in response to the creation request of the transfer resource to the third M2M/IoT device, determining whether the indicator is present in the created transfer resource, when the indicator is present in the created transfer resource, creating a subscription resource for enabling a notification of a change in a resource related to the control operation in order to ensure processing of the control operation, upon receiving a creation request of a resource including a result of processing of the control operation from the second M2M/IoT device, creating the resource including the result of processing of the control operation, and transmitting a control result notification including the result of processing of the control operation according to the created subscription resource to the third M2M/IoT device.

Additionally or alternatively, the method may further include transmitting a notification message including content of the control message or the indicator and instructing the control operation to the second M2M/IoT device according to a pre-created subscription resource, and receiving, from the second M2M/IoT device, a creation request of a resource including the result of processing of the control operation according to the notification message.

Additionally or alternatively, the indicator may further indicate a creation request of a resource including the result of processing of the control operation to the second M2M/IoT device.

Additionally or alternatively, the creating the subscription resource may further include mapping an identifier of the resource creation request and the subscription resource.

Additionally or alternatively, the creating the subscription resource may further include limiting a number of the notification of the change in the resource related to the control operation to one.

Additionally or alternatively, The method may further include, upon receiving a response in response to a transmission of the notification of control result including the result of processing of the control operation from the third M2M/IoT device, deleting the created subscription resource.

In another aspect of the present invention, provided herein is a machine to machine (M2M)/Internet of Things (IoT) device configured to ensure processing of a control operation in a wireless communication system, the M2M/IoT device including a radio frequency (RF) unit and a processor configured to control the RF unit, wherein the processor is configured to transmit a resource creation request for transmitting a control message instructing a control operation of a second M2M/IoT device to a third M2M/IoT device, the resource creation request including content of the control message, an indicator for requesting for ensuring processing of the control operation, or an identifier of the resource creation request, to receive a resource creation response in response to the resource creation request from the third M2M/IoT device, to receive a control result notification including a result of processing of the control operation according to the indicator from the third M2M/IoT device, the control result notification including the identifier of the resource creation request, and to check whether the content of the control message and content of the control result notification are the same.

Additionally or alternatively, The indicator may trigger creation of a subscription resource for enabling a notification of a change in resource related to the control operation in order to ensure processing of the control operation.

Additionally or alternatively, The processor may be configured to apply the content of the control result notification to a status of the first M2M/IoT device when the content of the control message and the content of the control result notification are the same.

Additionally or alternatively, The processor may be configured to retransmit the resource creation request to the third M2M/IoT device when the content of the control message and the content of the control result notification are not the same.

In another aspect of the present invention, provided herein is a machine to machine (M2M)/Internet of Things (IoT) device configured to ensure processing of a control operation in a wireless communication system, the M2M/IoT device including a radio frequency (RF) unit, and a processor configured to control the RF unit, wherein the processor is configured to receive a creation request of a resource (hereinafter, referred to as "transfer resource") for transmitting a control message instructing a control operation of a second M2M/IoT device from a third M2M/IoT device, the resource creation request including content of the control message, an indicator for requesting for ensuring of processing of the control operation, or an identifier of the resource creation request, to create the transfer resource according to the resource creation request, to transmit a resource creation response in response to the creation request of the transfer resource to the third M2M/IoT device, to determine whether the indicator is present in the created transfer resource, to create a subscription resource for enabling a notification of a change in a resource related to the control operation in order to ensure processing of the control operation when the indicator is present in the created transfer resource, to create the resource including the result of processing of the control operation upon receiving a creation request of a resource including a result of processing of the control operation from the second M2M/IoT device, and to transmit a control result notification including the result of processing of the control operation according to the created subscription resource to the third M2M/IoT device.

Additionally or alternatively, The processor may be configured to transmit a notification message including content of the control message or the indicator and instructing the control operation to the second M2M/IoT device according to a pre-created subscription resource, and to receive, from the second M2M/IoT device, a creation request of a resource including the result of processing of the control operation according to the notification message.

Additionally or alternatively, The indicator may further indicate a creation request of a resource including the result of processing of the control operation to the second M2M/IoT device.

Additionally or alternatively, The processor may be configured to map an identifier of the resource creation request and the subscription resource during creating the subscription resource.

Additionally or alternatively, The processor may be configured to limit a number of the notification of the change in the resource related to the control operation to one during creating the subscription resource.

Additionally or alternatively, The processor may be configured to delete the created subscription resource upon receiving a response in response to a transmission of the notification of control result including the result of processing of the control operation from the third M2M/IoT device.

It is to be understood that both the foregoing general description and the following detailed description of the present invention are exemplary and explanatory and are intended to provide further explanation of the invention as claimed.

Advantageous Effects

According to the present invention, in an exemplary embodiment of the present invention, schedule information in a wireless communication system may be changed to enhance the efficiency of an operation of a corresponding application.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 10 illustrates influence of a message for normal simultaneous device control, which is generated via a smart grid service, on a network;

BEST MODEL

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M/IoT server to transmit/receive user data and/or various types of control information. The M2M/IoT devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M/IoT server refers to a fixed station which communicates with M2M/IoT devices and/or other M2M/IoT servers, and exchanges various types of data and control information with M2M/IoT devices and/or other M2M/IoT servers by communicating with the M2M/IoT devices and/or other M2M/IoT servers.

A description will be given of technology associated with the present invention.

M2M/IoT Applications

These are applications that execute service logic and use a common service entity (CSE) accessible through an open interface. The M2M/IoT applications can be installed in an M2M/IoT device, an M2M/IoT gateway or an M2M/IoT server.

M2M/IoT Service

This is a set of functions that can be used by the M2M/IoT CSE through standardized interfaces.

oneM2M/IoT defines a common M2M/IoT service framework (or service platform, CSE or the like) for various M2M/IoT applications (or application entities (AEs)). M2M/IoT applications can be considered as software implementing service logic such as e-Health, City Automation, Connected Consumer and Automotive. The oneM2M service framework includes functions commonly necessary to implement various M2M/IoT applications. Accordingly, it is possible to easily implement various M2M/IoT applications using the oneM2M/IoT service framework without configuring frameworks necessary for the respective M2M/IoT applications. This can integrate M2M/IoT markets currently divided into many M2M/IoT verticals, such as smart building, smart grid, e-Heath, transportation and security, and thus remarkable growth of the M2M/IoT markets is expected.

Figure 1:
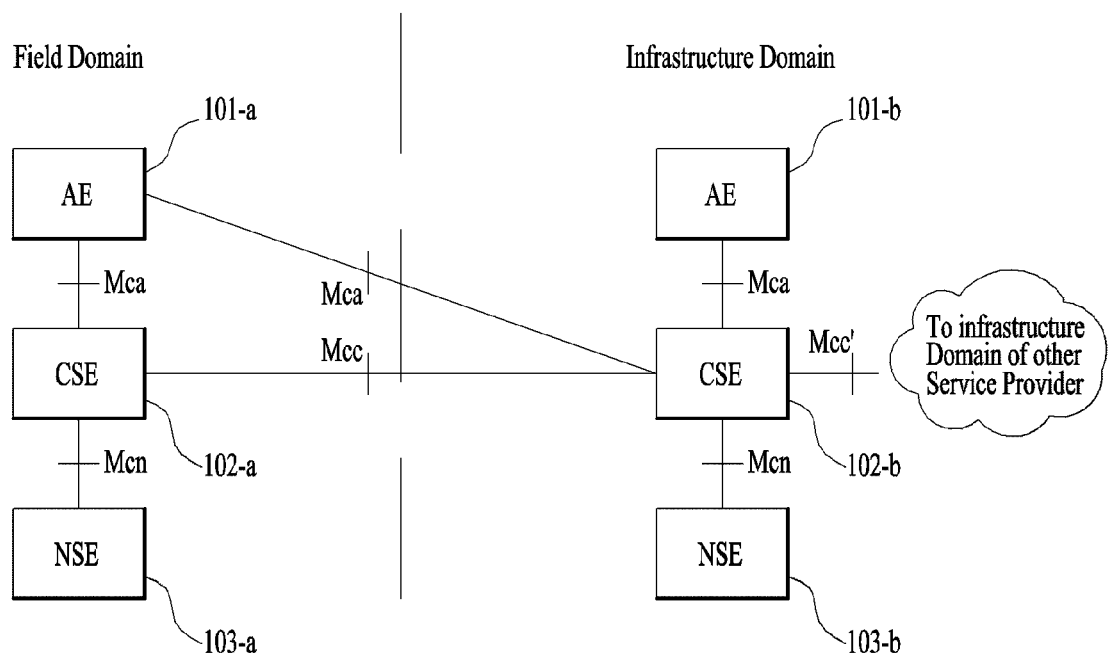
FIG. 1 illustrates a functional structure in an M2M/IoT communication system.

FIG. 1 illustrates the architecture of an M2M/IoT communication system. Each entity will now be described.

Application entity (AE, 101): Application entity provides application logic for end-to-end M2M/IoT solutions. Examples of the application entity include fleet tracking application, remote blood sugar monitoring application, remote power metering and controlling application.

Common service entity (CSE, 102): CSE comprises the set of "service functions" that are common to M2M/IoT environments and specified by oneM2M/IoT. Such service functions are exposed to AEs and other CSEs through reference points X and Y and used by the AEs and other CSEs. The reference point Z is used for accessing underlying network service entities.

Examples of the service functions provided by the CSE include data management, device management, M2M/IoT subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M/IoT system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M/IoT physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M/IoT service providers. Mcc' references point is similar to Mcc reference point in respect of connecting CSEs each other, but Mcc' reference point expands Mcc reference point to different M2M/IoT service providers while Mcc reference point is limited to communication in a single M2M/IoT service provider.

Figure 2:
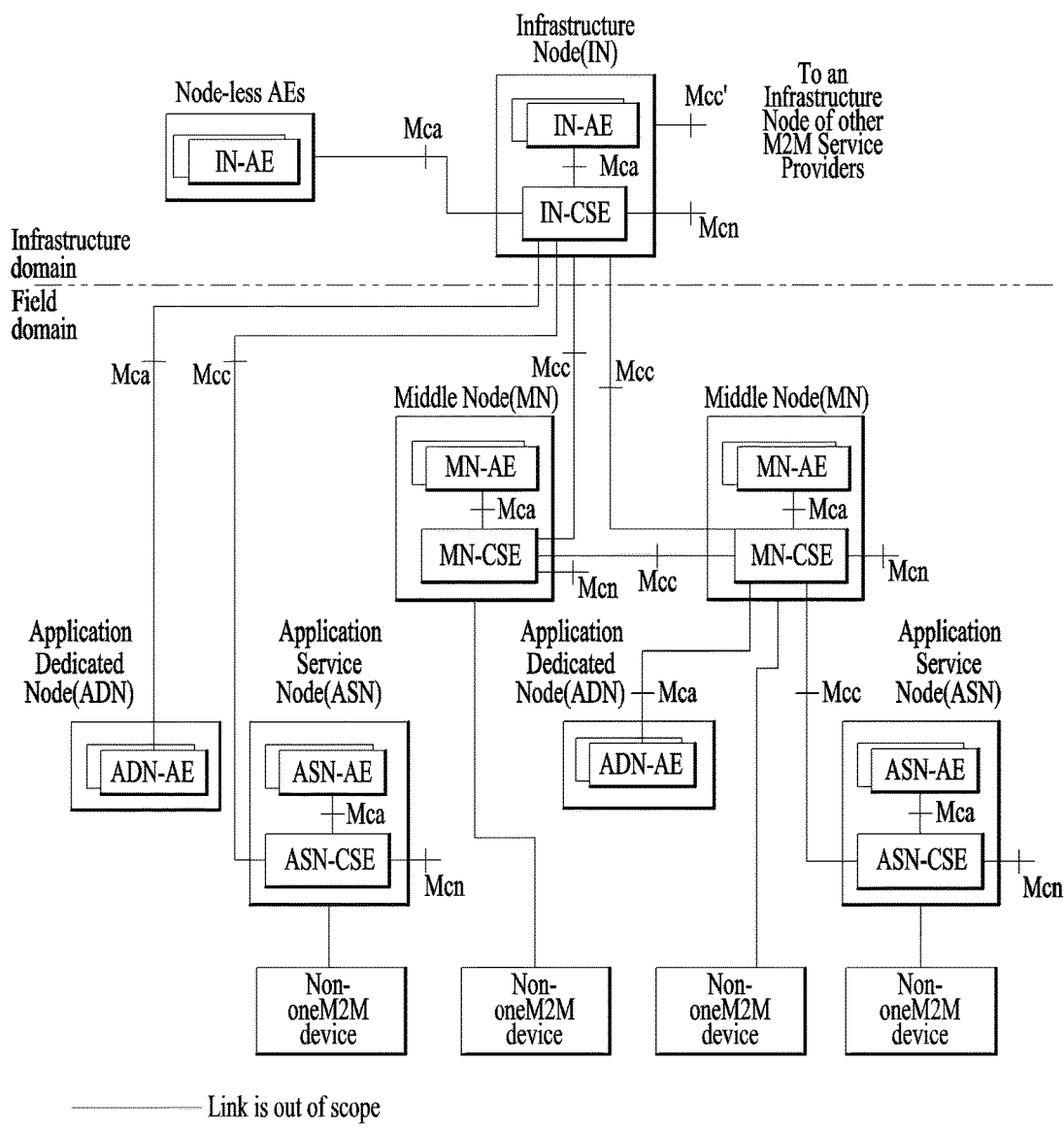
FIG. 2 illustrates a configuration supported by an M2M/IoT communication system based on an M2M/IoT functional structure.

FIG. 2 illustrates compositions supported by M2M/IoT communication system based on the architecture. The M2M/IoT communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M/IoT device.

Application Service Node (ASN): An application service node is a node that contains at least one CSE and has at least one M2M application. The ASN can communicate over a Mcc reference point with one middle node or one infrastructure node. The ASN can be present in an M2M/IoT device.

Middle Node (MN): A middle node is a node that contains at least one CSE and may contain M2M applications. The middle node communicates over a Mcc references point with at least two nodes belonging to the following different category:
one or more ASNs;
one or more middle nodes (MNs); and
one infrastructure structure.

The MN can be connected with the ADN through an Mca reference point. The MN can be present in an M2M/IoT gateway.

Infrastructure Node (IN): An infrastructure node is a node that contains one CSE and may contain application entities (AEs). The IN can be present in M2M/IoT server.

The IN communicates over a Mcc reference point with either:
one or more middle nodes; and/or
one or more application service nodes.

The IN may communicate with one or more ADNs over one or more Mca reference points.

Figure 3:
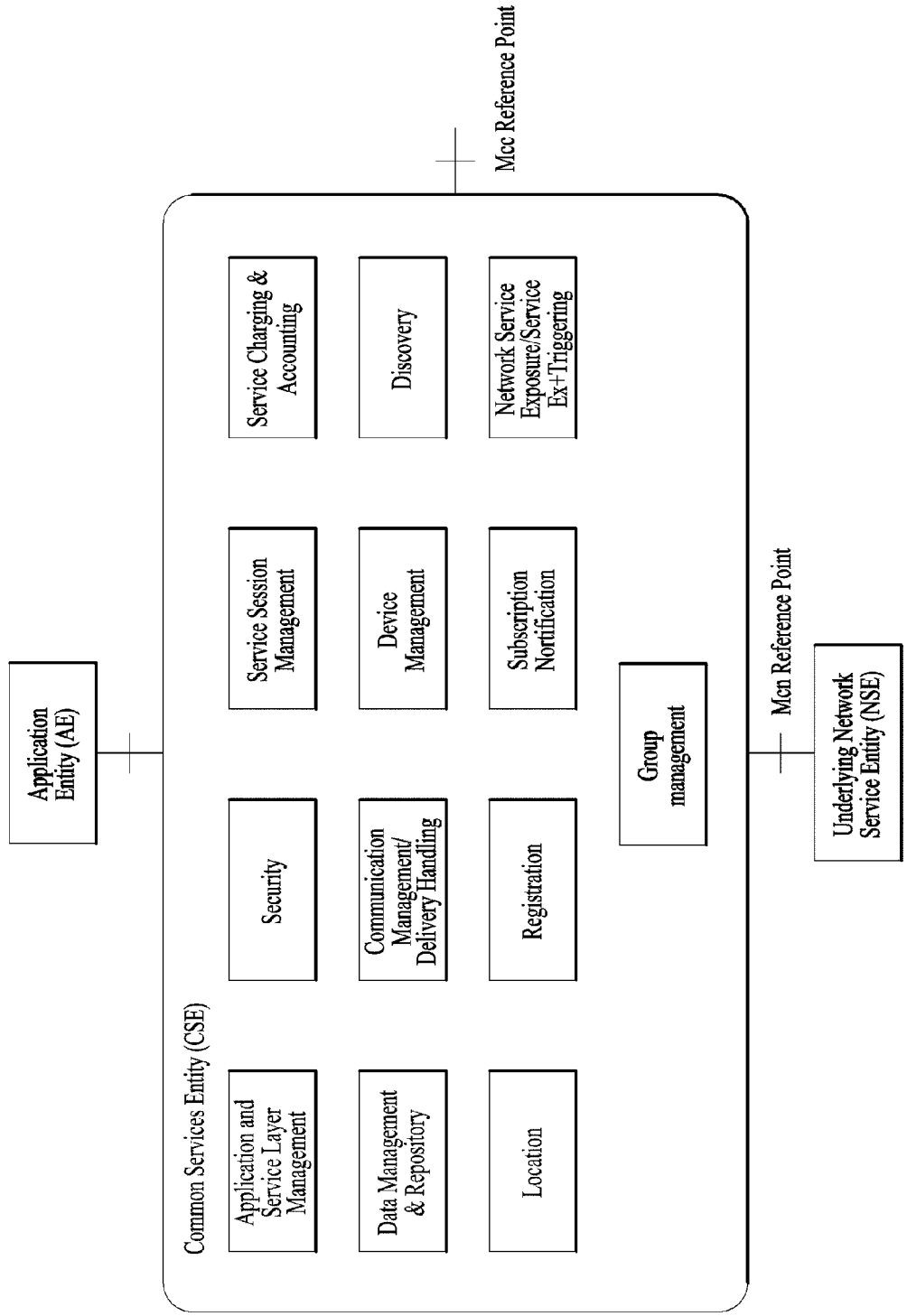
FIG. 3 illustrates a common service function provided in an M2M/IoT communication system.

FIG. 3 illustrates M2M service functions in the M2M/IoT communication system.

M2M/IoT service functions (i.e. common service functions) provided by the M2M/IoT communication system include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M/IoT applications to exchange and share data.

Device Management (DMG): this manages M2M/IoT devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M/IoT devices or gateways.

Addressing and Identification (AID): this identifies and addresses physical or logical resources.

Location (LOC): this enables M2M/IoT applications to obtain position information of an M2M/IoT device or gateway.

Network Service Exposure, Service Execution and Triggering (NSE): this enables communication of an underlying network and use of functions provided by the underlying network.

Registration (REG): this handles registration of an M2M/IoT application or another CSE with a specific CSE. Registration is performed in order to use M2M/IoT service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M/IoT session for end-to-end communication.

Subscription and Notification (SUB): this notifies change of a specific resource when the change of the specific resource is subscribed.

The M2M/IoT common service functions are provided through CSE, and AE (or, M2M/IoT applications) may use through Mca reference point, or other CSE may use the M2M service functions through Mcc reference point. Also, the M2M/IoT service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term "resource" in the M2M/IoT communication system may be used to construct and express information in the M2M/IoT communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
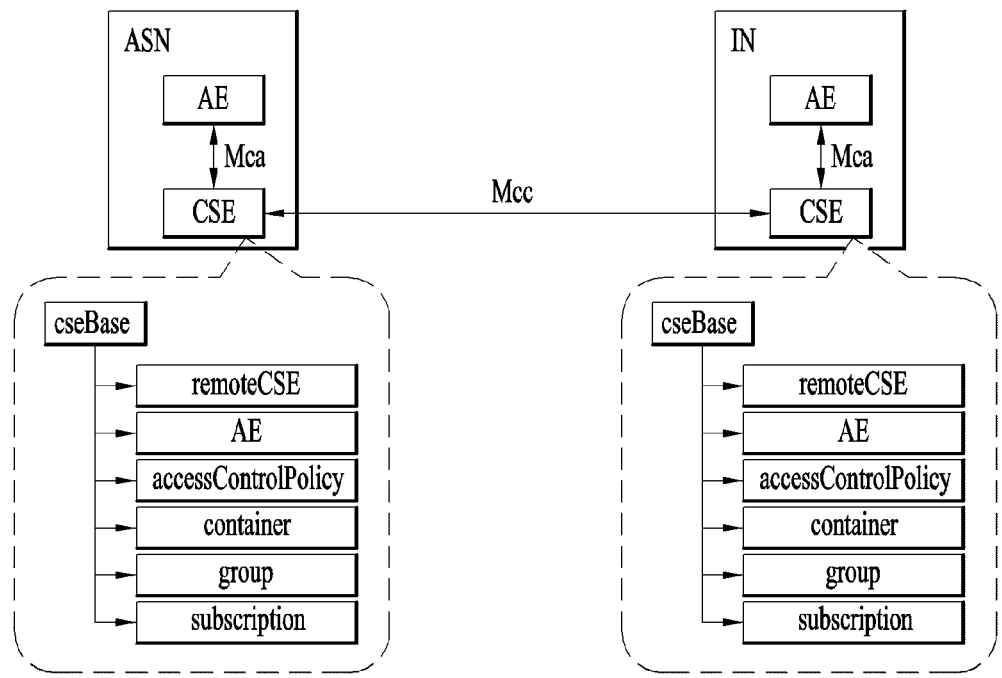
FIG. 4 illustrates a structure of resource present in an M2M/IoT application service node and an M2M/IoT infrastructure node.

FIG. 4 illustrates structures of resources present in an M2M/IoT application service node and an M2M/IoT infrastructure node.

The M2M/IoT communication system defines various resources. M2M/IoT services for registering applications and reading sensor values can be performed by operating the resources. The resources are configured in one tree structure and may be logically connected to the CSE or stored in the CSE to be stored in M2M/IoT devices, M2M/IoT gateways, network domains and the like. Accordingly, the CSE can be referred to as an entity that manages resources. The resources have a <cseBase> as a tree root. Representative resources are described below.

<cseBase> resource: this is a root resource of M2M/IoT resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
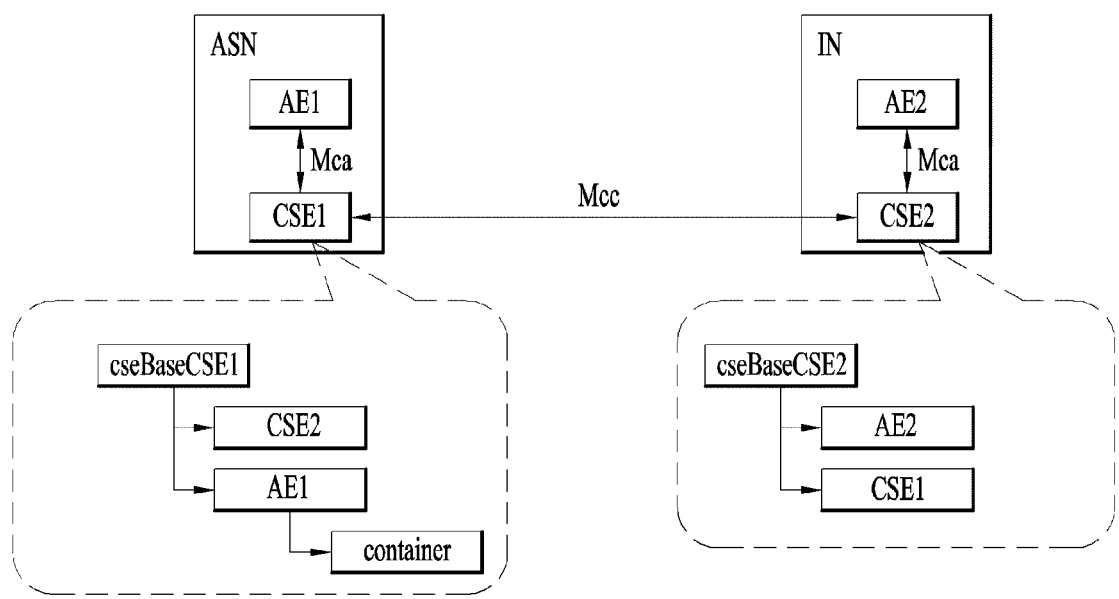
FIG. 5 illustrates a resource structure present in an M2M/IoT application service node (e.g., M2M/IoT device) and an M2M/IoT infrastructure node.

FIG. 5 illustrates structures of resources present in an M2M/IoT application service node (e.g. M2M/IoT device) and an M2M/IoT infrastructure node.

A description will be given of a method by which an AE (application 2) registered with the M2M/IoT infrastructure node reads a value of a sensor of the M2M/IoT device. The sensor refers to a physical device, in general. An AE (application 1) present in the M2M/IoT device reads a value from the sensor and stores the read value in the form of a container resource in a CSE (CSE 1) in which the AE (application 1) has registered. To this end, the AE present in the M2M/IoT device needs to be pre-registered with the CSE present in the M2M/IoT device. Upon completion of registration, registered M2M/IoT application related information is stored in the form of cseBaseCSE1/application1 resource, as shown in FIG. 5.

When the sensor value is stored, by the AE present in the M2M/IoT device, in a container resource lower than the cseBaseCSE1/application 1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M/IoT system may be represented by a tree structure, and the root resource type may be denoted by <CSEBase>. Therefore, the <CSEBase> resource type must be present only when the common service entity (CSE) is present.

Figure 6:
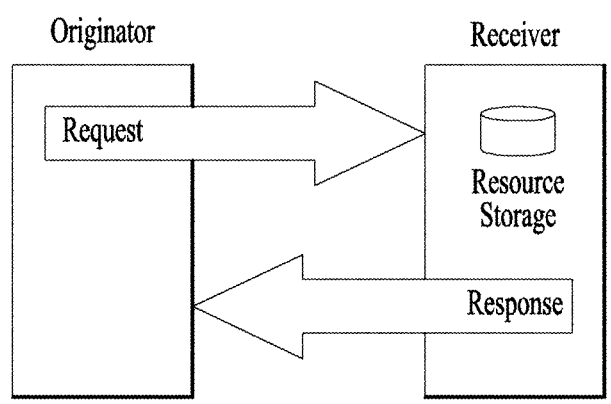
FIG. 6 illustrates a procedure of transmitting and receiving a request and a response message used in an M2M/IoT communication system.

FIG. 6 is a conceptual diagram illustrating a general communication flow located at Mca and Mcc reference points. The M2M/IoT system operation is carried out on the basis of data exchanging. For example, in order to allow a first device to transmit or perform a command for stopping a specific operation of a second device, the first device must transmit the corresponding command (configured in a data form) to the second device. In the M2M/IoT system, data can be exchanged using the request and response messages during communication between the application (or CSE) and another CSE.

The request message may include the following information.

op: "op" means the shape of an operation to be carried out. (This information may be selected from among Create, Retrieve, Update, Delete, and Notify.)

to: "to" means an ID (i.e., ID of the receiver) of an entity scheduled to receive the request.

fr: "fr" means an ID of a calling user (i.e., call originator) who generates the request.

ri: "ri" means an ID (i.e., ID used to discriminate the request message) of the request message mi: "mi" means additional information for the request message (meta information)

cn: "cn" means content of resources to be transmitted.

The response message may include the following information. If the corresponding request message is successfully processed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message used to identify the ID of the request message.

mi: "mi" means additional information for the request message (meta information)

rs: "rs" means the processed result (for example, Okay, Okay and Done, Okay and in progress) of the request message.

ai: "ai" means additional information cn: "cn" means content of resources to be transmitted (only the resultant value (rs) can be transmitted.)

If the request message processing is failed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message (so as to identify the ID of the request message).

mi: "mi" means additional information for the request message (meta information)

rs: "rs" means the processed result (for example, Not Okay) of the request message.

ai: "ai" means additional information

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControl Policy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControl Policy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControl Policy, subscription, mgmtObj, pollingChannel, node | CSEBase |

TABLE 1-continued

| Resource Type | Short Description | Child Resource Types | Parent Resource Types |
|---|---|---|---|
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resource Type attribute. |
| resourceID | 1 | RO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource " . . . //example.com/oneM2M/IoT/myCSE", the value of the parentID attribute will contain " . . . //parentID". |

TABLE 2-continued

| Attributes of <container> | Multiplicity | RW/RO/WO | Description |
|---|---|---|---|
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M/IoT service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |

TABLE 2-continued

| Attributes of <container> | Multiplicity | RW/RO/WO | Description |
|---|---|---|---|
| announceTo | 0 ... 1 | RW | This attribute may be included in a CREATE or UPDATE Request in which case it contains a list of URIs/CSE-IDs which the resource being created/updated shall be announced to.<br>This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 ... 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 ... 1 | RW | Maximum number of instances of <contentInstance> child resources. |
| maxByteSize | 0 ... 1 | RW | Maximum number of bytes that are allocated for a <container> resource for all instances in the <container> resource. |
| maxInstanceAge | 0 ... 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 ... 1 | RO | Reference to latest <contentInstance> resource, when present. |
| locationID | 0 ... 1 | RW | URI of the resource where the attributes/policies that define how location information are obtained and managed. This attribute is defined only when the <container> resource is used for containing location information. |
| ontologyRef | 0 ... 1 | RW | A URI of the ontology used to represent the information that is managed and understood by the AE.<br>The ontology refers to a specification in which terms and relationship therebetween used in a domain to be handled. |

Figure 7:
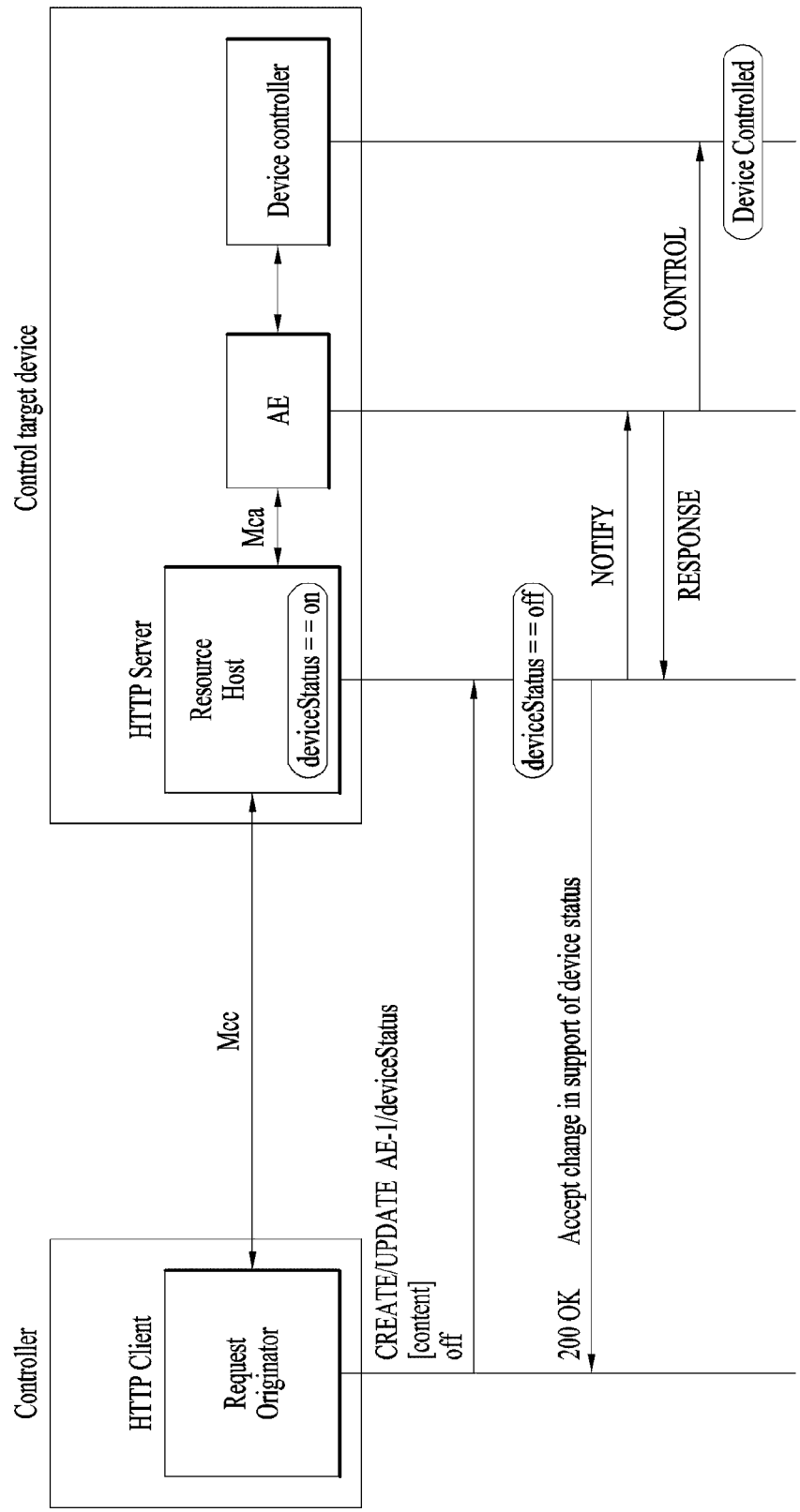
FIG. 7 illustrates a representation state transfer (REST) system.

FIG. 7 illustrates a representation state transfer (REST) system. The REST system is characterized by transferring a state of a specific resource through a communication medium. As illustrated in FIG. 7, when there are a controller and a controlled device, a request originator may make a request to a resource host with a resource for change in a resource state and the resource host may transmit a response to the request.

Consequently, when the request for change in the corresponding resource state is performed in order to change a physical state of an actual apparatus, the REST system transfers a resource state through a communication medium and also detects and changes a corresponding physical state.

Figure 8:
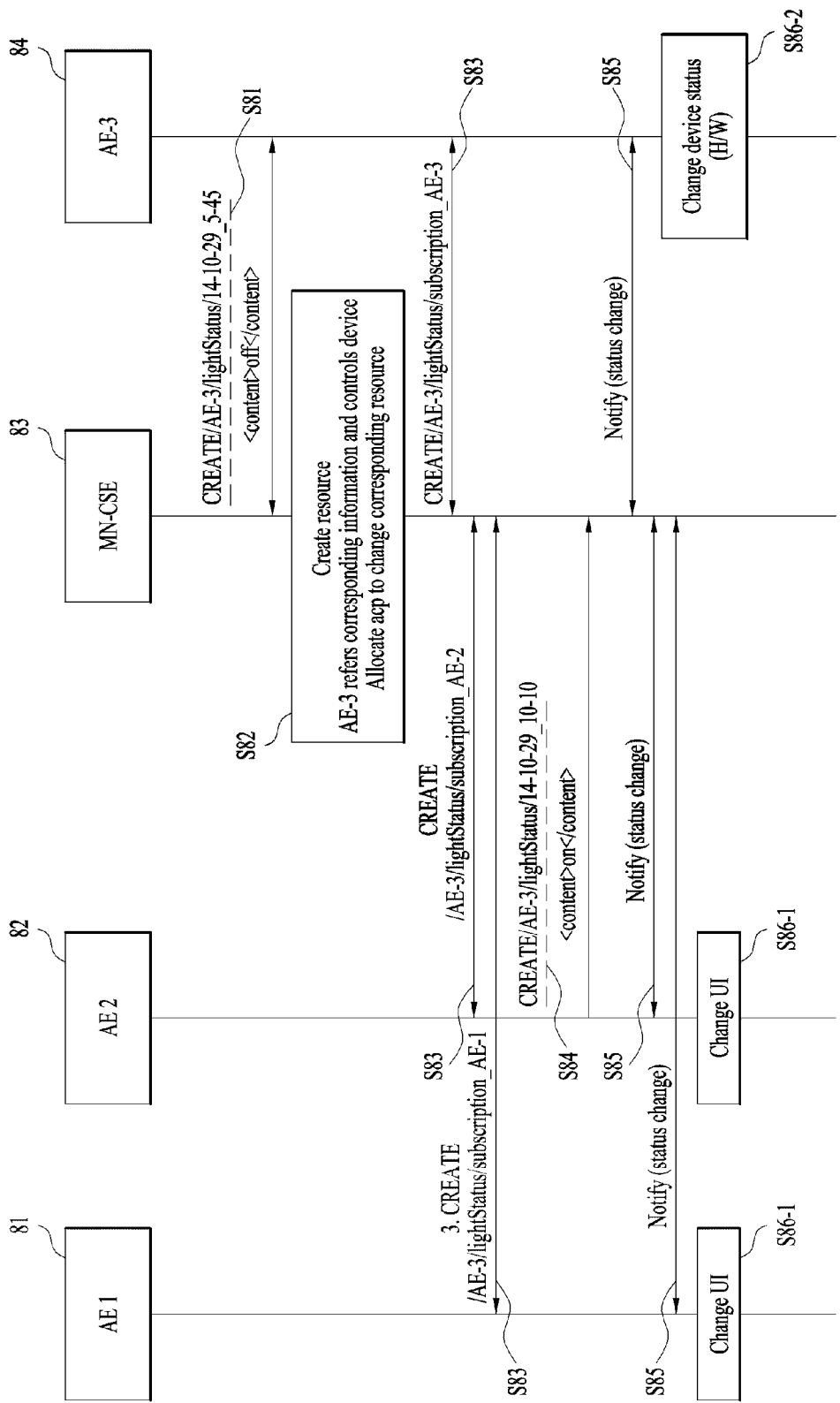
FIG. 8 is a diagram for explanation of a method of controlling a device in an M2M/IoT system.

FIG. 8 is a diagram for explanation of a method of controlling an apparatus in an M2M/IoT system. In particular, a method of controlling a resource based on the <container> resource and containerInstance obtained by objectifying the same will be described.

An AE-1 81 and an AE-2 82 may each refer to an application installed or included in a controller (or a control device) for controlling an AE-3 84 and the AE-3 may refer to an application installed or included in a device controlled by the controller. An MN_CSE 83 may refer to an application installed or included in a gateway in which the AE-1, the AE-2, and the AE-3 are registered. An apparatus including the AE-3 will be exemplified as a light device in an example related to FIG. 8.

S81: The AE-3 includes service logic of a controllable device. When the service logic of the AE-3 is initially connected to the MN-CSE, a request for creation of <container> and <contentInstance> may be transmitted to the MN-CSE in order to perform a registration procedure and to change an AE state according to an external request. As the example related to FIG. 8, <container> and <contentInstance> may be objectified as lightStatus and 14-10-29_5-45 and specify a status of the light device in content attributes of <contentInstance>. Here, an initial status of the light device is set to 'off'.

S82: The MN-CSE may create a resource according to a request of the AE-3 and set access control related information to permit the AE-1 or the AE-2 to change a corresponding resource. In reality, the access control related information may be determined according to setting of a service provider.

S83: The AE-3 may register <subscription> in the <container> resource specifying the created status of the light device so as to receive notification about an external control request. That is, the AE-3 subscribes the <container> resource.

The subscription operation may be performed by the AE-3 and other AEs (AE-1 and AE-2 in the example of FIG. 8) that want control from outside after operations S81 and S82 are terminated. This is because external devices need to recognize a status of the light device and to display the state through a graphic user interface (GUI) or the like.

S84: The AE-2 needs to change the state of the AE-3 (i.e., the light device) and, thus, to this end, may transmit a creation request of new <contentInstance> to the MN-CSE. That is, the AE-2 may make a request to the MN-CSE for creation of lightStatus/14-10-29_5-45 resource including the content attribute in order to specify the changed status (e.g., 'on') of the light device in the content attribute of <contentInstance>.

S85: According to a result of the subscription operation of operation S83, the AE-1, the AE-2, and the AE-3, which subscribe the <container> resource, may be notified of the changed status.

S86: Upon receiving the changed status, the AE-1 or the AE-2 may change a UI and so on according to service logic and the AE-3 may change a physical state of the light device.

In FIG. 8, the UI or the like of the AE-1 and the AE-2 may display change in the status of the light device according to notification of operation S85 and the status of the light device may be actually changed after the AE-3 receives notification of operation S85. When the AE-3 fails in change in the status of the light device (e.g., communication issue between the MN and the CSE and physical malfunction), there is a problem in that the UI or the like of the AE-1 and the AE-2 displays wrong information. That is, the notification of operation S85 may not ensure success in control of the light device. This problem occurs because the request and response thereto simply change a value of a corresponding resource but do not ensure change in an actual status of a device in a message flow for changing a status of an actual (hardware) device with a communication structure of request/response in an REST-based resource-based structure.

Figure 9:
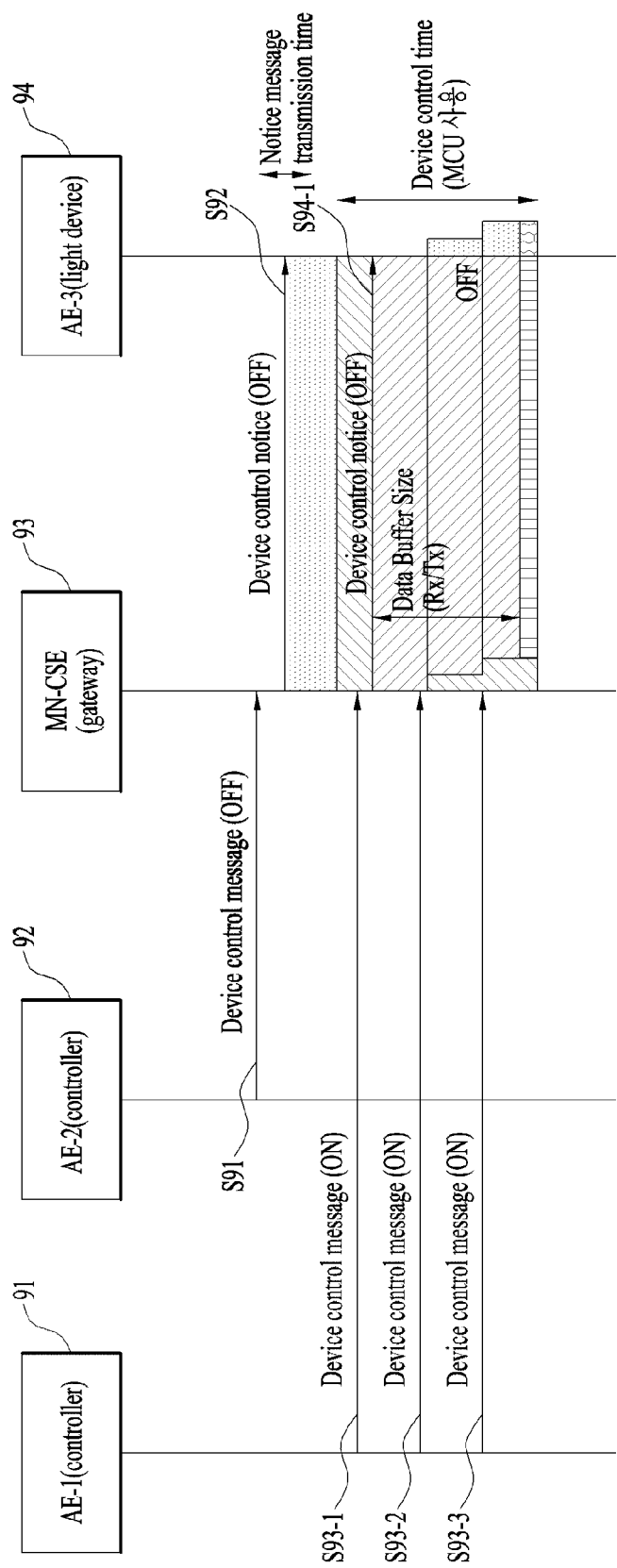
FIG. 9 illustrates a situation in which request for changing a status of a specific device is created from a plurality of controllers.

FIG. 9 illustrates a situation in which a request for change in a status of a specific device is created from a plurality of controllers. Differently from transmission of a message for the request, relative much time may be consumed to change the status of the specific device. In this situation, an AE-2 92 may transmit a message for device control to a MN-CSE 93 (S91) and, accordingly, the MN-CSE may transmit device control notice to the AE-3 (S92). Accordingly, the AE-3 may perform the device control. Upon receiving a message for other device control from a plurality of AEs AE-1 during device control (S93-1, S93-2, and S93-3), the AE-3 may not appropriately process the message for device control.

As illustrated in FIG. 9, a message for normal device control may be received or a message for malicious device control may be received.

FIG. 10 illustrates influence of simultaneous device control messages generated for each time zone, which are checkable in a smart grid service, on a network. A vertical axis of a left portion of FIG. 10 corresponds to a number of event packets. Even normal simultaneous device control messages may not ensure device control due to performance or capacity of a target device of device control. For example, a simultaneous message is not stored in a memory buffer and, thus, device control may not be ensured due to insufficient capacity of the target device of device control.

Figure 11:
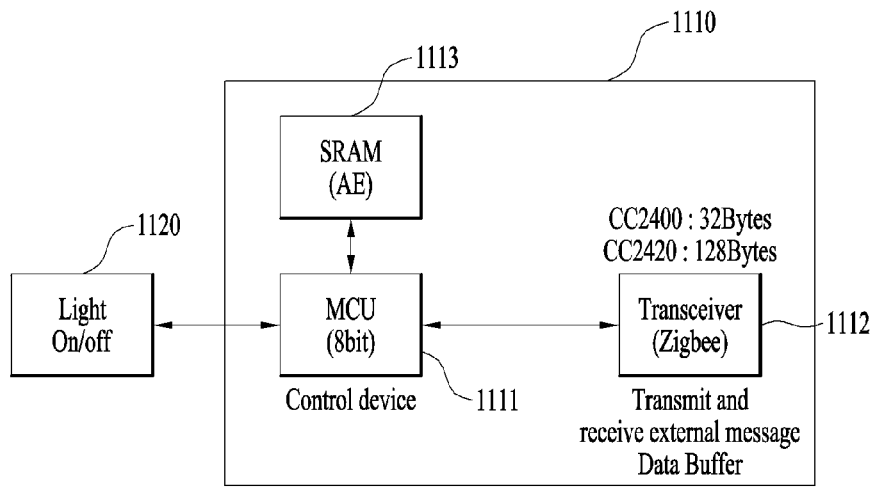
FIG. 11 illustrates a hardware component used by a general hardware constraint device.

FIG. 11 illustrates a hardware component used by a general hardware constraint device.

The hardware constraint device 1110 may include a micro controller unit (MCU) 1111 for device control and control of all AEs, an SRAM 1112 for storing service logic of an AE and an operating system (OS), and a transceiver 1113 for transmitting/receiving a message via communication (e.g., Bluetooth and Zigbee). The transceiver may include a data buffer that temporally stores a message received from an external source or from an MCU. In addition, a light on/off 1120 may correspond to a module or device for a user interface for indicating a status of the hardware constraint device (e.g., light device), that is, whether the hardware constraint device is turned on or off.

A size of the data buffer may be varied according to a hardware component or user purpose. For example, in a hardware constraint device (e.g., light device) that is requirements for low power and small sizes, a data buffer with a relatively very small size is supported by a transceiver. In general, a narrowband-type device includes a data with a relatively small size. In a specific device, a data buffer may not supported by a transceiver. In this case, in general, a memory present in an MCU may be directly accessed using a direct memory access (DMA) scheme but, when the MCU for a hardware constraint device also includes a restrictive memory and a message is received such that processing speed of the MCU exceeds processing speed of a data buffer of a memory or a transceiver, a predetermined request may not be processed.

Accordingly, the present invention proposes a method for overcoming the aforementioned problems.

Figure 12:
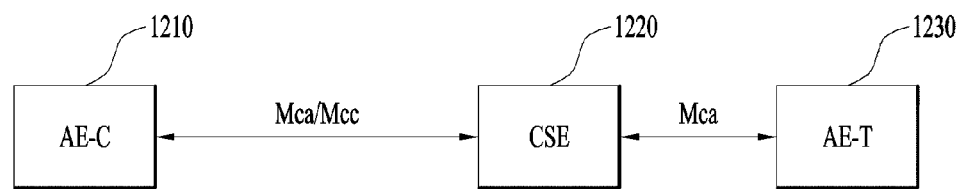
FIG. 12 illustrates a structure of a system according to an exemplary embodiment of the present invention.

FIG. 12 illustrates a structure of a system according to an exemplary embodiment of the present invention.

Figure 13:
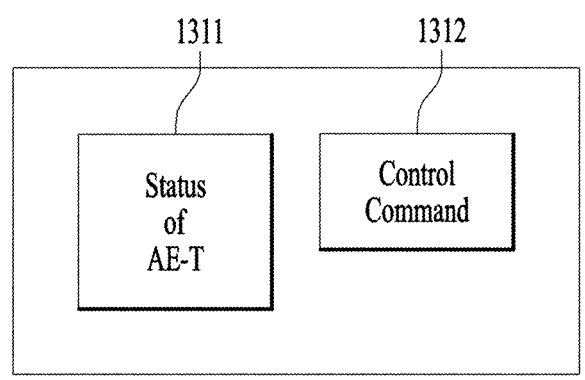
FIG. 13 illustrates a structure of an entity according to an exemplary embodiment of the present invention.

An AE-C 1210 may be an entity including service logic to be controlled according to user input and, in general, may be programmed in the form of a GUI. In general, the AE-C is a graphic object and represents a status of AE-T 1311 and a control command 1312 for change in status, as illustrated in FIG. 13. When the graphic object indicating the command for change in status is selected (pushed, touched, clicked, etc.), a request for updating a resource representing a status of the AE-T may be transmitted to a CSE 1220 from the AE-C and may be re-transmitted to the AE-T.

Figure 14:
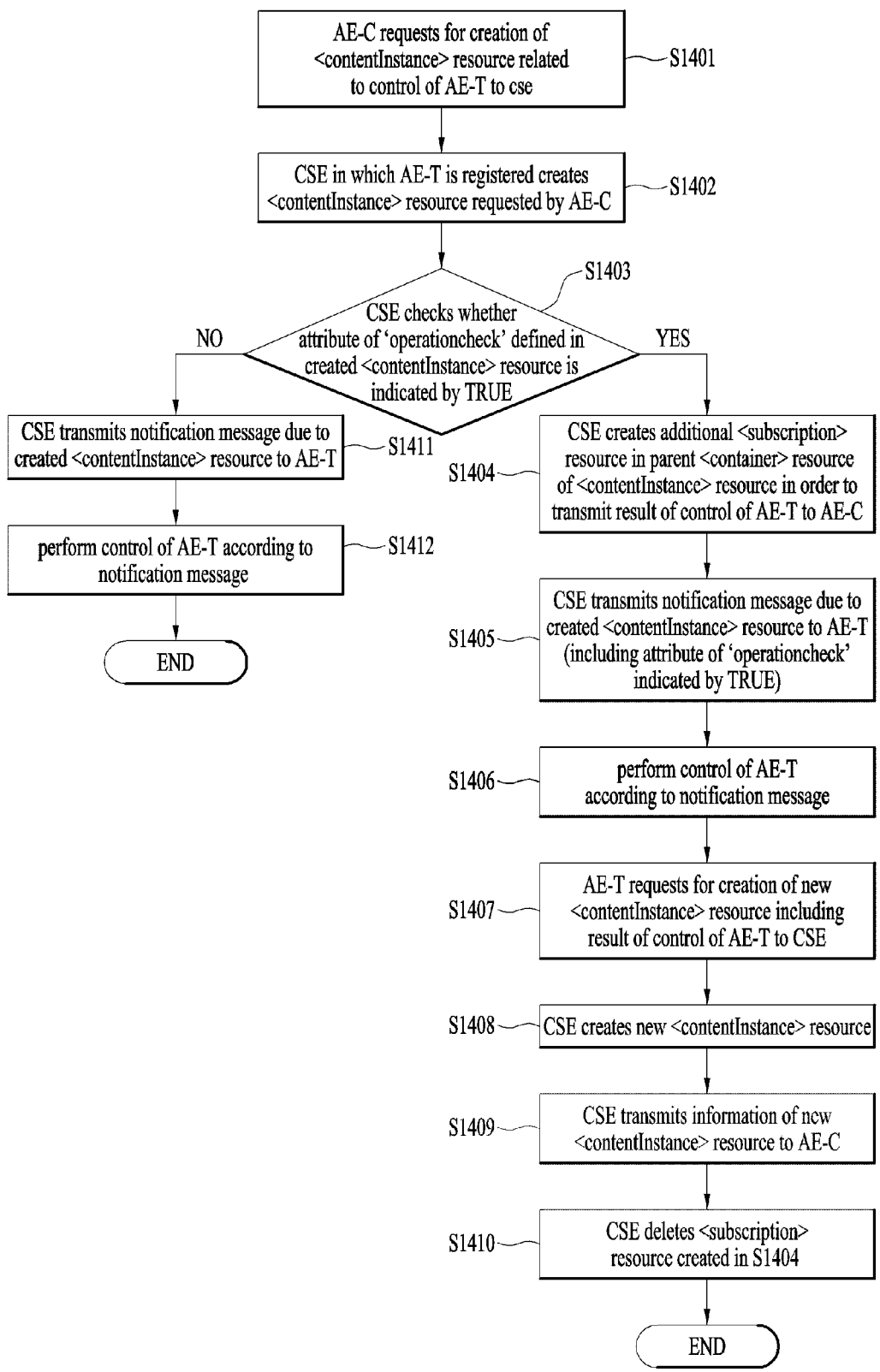
FIG. 14 illustrates a method for ensuring change in physical status of a corresponding device according to a device control request according to an exemplary embodiment of the present invention.

FIG. 14 illustrates a method for ensuring change in physical status of a corresponding device according to a device control request according to an exemplary embodiment of the present invention. In an exemplary embodiment that will be described with regard to FIG. 14, it is assumed that a control target device (e.g., light device) (or AE installed or stored in corresponding device) generates the <container> resource in a CSE in which the device is registered and registers the <subscription> resource in order to acquire change information on the generated resource.

FIG. 14 is described in terms of the structure of FIG. 12, an AE-C corresponds to an AE in a controller, and an AE-T corresponds to an AE in a control target device.

The AE-C may make a request to the CSE for creation of the <contentInstance> resource including a device control message for the AE-T and an indicator that requires ensuring of device control (S1401). The <contentInstance> resource needs to be created as a child resource of the <container> resource of the CSE. The following table defines attributes of the <contentInstance> resource.

TABLE 3

| Attributes of <contentInstance> | Multiplicity | RW/RO/WO | Description |
| --- | --- | --- | --- |
| resourceType | 1 | RO | Refer to Table 2 |
| resourceID | 1 | WO | Refer to Table 2 |
| parentID | 1 | RO | Refer to Table 2 |
| labels | 0 . . . 1 | WO | Refer to Table 2 |
| creationTime | 1 | RO | Refer to Table 2 |
| lastModifiedTime | 1 | RO | Refer to Table 2 |
| stateTag | 1 | RO | Refer to Table 2 |
| announceTo | 1 | RW | Refer to Table 2 |
| annoucedAttribute | 1 | RW | Refer to Table 2 |
| typeOfContent | 0 . . . 1 | WO | Type of the content included in the content attribute. |
| contentSize | 1 | WO | Size in bytes of the content attribute. |
| ontologyRef | 0 . . . 1 | WO | Refer to Table 2 |
| content | 1 | WO | Actual opaque content of a contentInstance. This may for example be an image taken by a security camera, or a temperature measurement taken by a temperature sensor. |
| operationCheck | 0..1 | RW | When a corresponding value is represented by TRUE, CSE performs an operation for ensuring a result of a physical control operation of AE of an apparatus (AE-T) associated with a corresponding resource. |

The device control message may be included in attribute of the 'content' and the indicator that requires ensuring of device control may be included in attribute of the 'operationCheck'. The device control message may be simply represented by 1 or 0 or may be represented using a complex manner such as 1_30_2_40, which complies with a policy of a service provider. The indicator that requires ensuring of device control may be represented by TRUE or FALSE and, unless otherwise mentioned, the indicator may be considered as FALSE.

The CSE in which the AE-T is registered may create the <contentInstance> resource requested by the AE-C (S1402).

In this case, the AE-C may not determine that the device is normally controlled according to success response of the corresponding creation.

The CSE may check whether attribute of the 'operationCheck' defined in the created <contentInstance> resource is indicated by TRUE (S1403).

When the attribute of the 'operationCheck' is indicated by TRUE, S1404 may be performed and, in other cases, S1411 may be performed.

The CSE may create the additional <subscription> resource in the parent <container> resource of the <contentInstance> resource in order to transmit a resource of future device control to the AE-C (S1404). The CSE may determine attribute of the 'notificationURI' of the corresponding <subscription> resource as the AE-C and set attribute of the 'expirationCounter' to 1. The following table defines the attribute of the 'expirationCounter'.

TABLE 4

| Attributes of <subscription> | Multiplicity | RW/RO/WO | Description |
| --- | --- | --- | --- |
| expirationCounter | 0 . . . 1 | RW | When the number of notifications becomes the same as this counter, the <subscription> resource shall be deleted. |

The CSE may transmit a notification message from the <contentInstance> resource created according to the request of the AE-C to the AE-T (S1405). This operation may be based on the assumption of the present embodiment in that the aforementioned corresponding subscription is pre-registered. The notification message may include a value of the attribute of the 'content' of the <contentInstance> resource as the based resource and, in this case, include a value of the attribute of the 'operationCheck' of the <contentInstance> resource indicated by TRUE that requires ensuring of device control.

The AE-T may control the device based on the notification message received in S1405 (S1406).

The AE-T may make a request to the CSE for creation of the new <contentInstance> resource including a result (i.e., actual result of device control instead of change in resource value related to device control) of S1406 according to the indicator that requires ensuring of device control, indicated in the notification message received in S1405 (S1407). The new <contentInstance> resource needs to be created as a child resource of the <container> resource of the CSE in order to signal, to the AE-C, that a resource for storing (or including) a result of S1406 is created according to subscription of S1404.

The CSE may create the <contentInstance> resource including a result of S1406 according to the resource creation request of S1407 (S1408).

The CSE may transmit information on the <contentInstance> resource created in S1408 according to setting of the subscription created in S1404 (S1409).

After receiving normal response to the transmission, the CSE may delete the corresponding subscript ion because a value of the attribute of the 'expirationTime' set in the subscription created in S1404 is set to 1 (S1410).

The case in which the attribute of the 'operationCheck' is not indicated by TRUE in S1403 will be described.

The CSE may transmit the notification message to the AE-T due to the <contentInstance> created according to the request of the AE-C (S1411). This operation is based on the aforementioned assumption of the present embodiment.

The AE-T may control the device based on the notification message received in S1411 (S1412).

Figure 15:
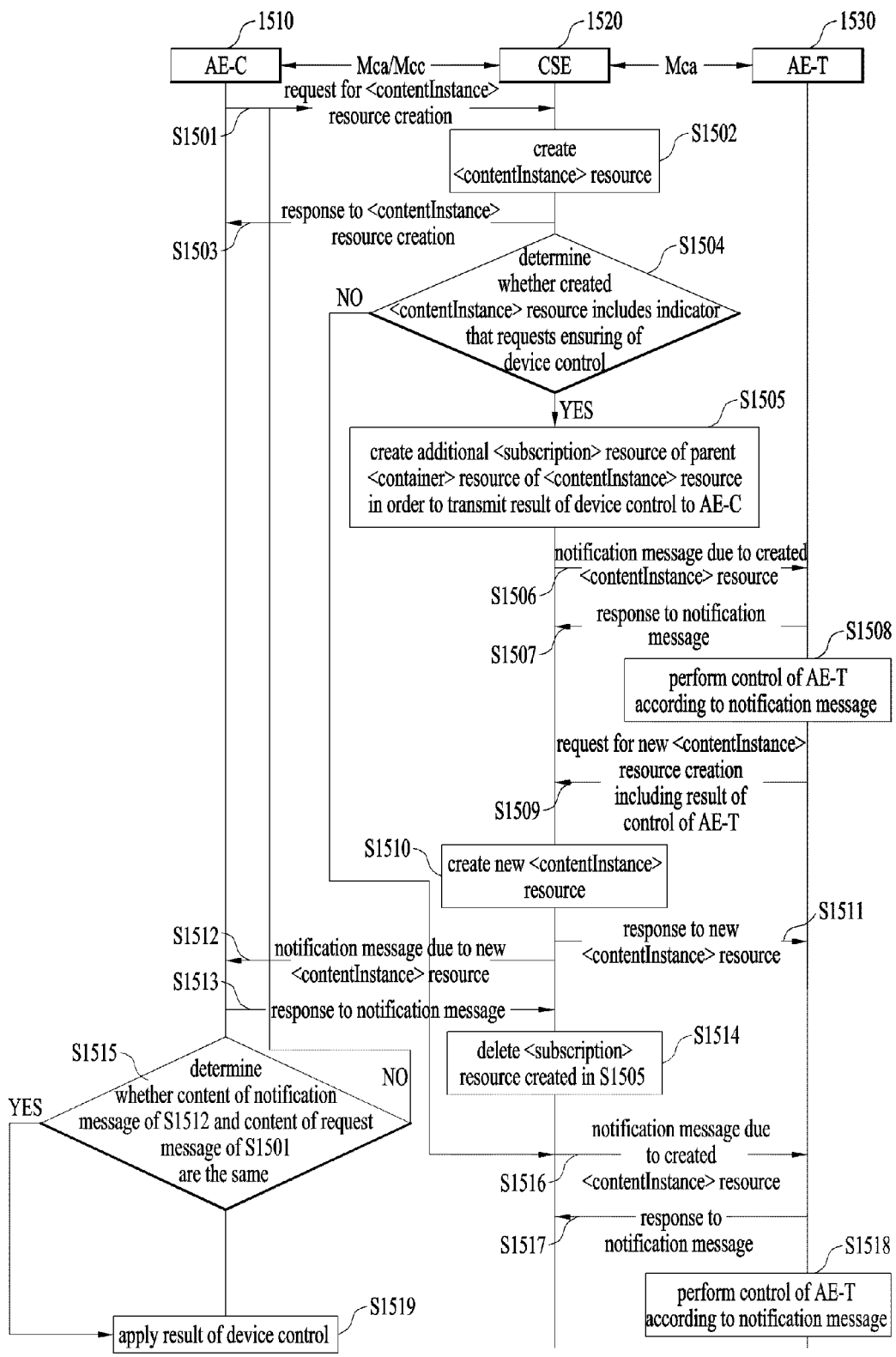
FIG. 15 illustrates the procedure of FIG. 14 in more detail.

FIG. 15 illustrates the procedure of FIG. 14 in more detail. Accordingly, the aforementioned assumption in the embodiment of FIG. 14 is maintained without changes.

An AE-C 1510 may transmit a request message for making a request to a CSE 1520 for creation of the <contentInstance> resource including a message for device control of an AE-T 1530 and an indicator (e.g., attribute of the 'operationCheck' indicated by TRUE) that requires ensuring of device control (S1501). The <contentInstance> resource needs to be created as a child resource of the <container> resource of the CSE. The request message may include a request identifier (ri).

The CSE may create the <contentInstance> resource requested by the AE-C (S1502).

The CSE may transmit the resource creation request of S1502 and a response message about a result thereof to the AE-C (S1503). In this case, the AE-C may not determine that the device is normally controlled according to success response of the corresponding creation.

The CSE may determine whether the indictor that requires ensuring of device control is included in the created <contentInstance> resource (S1504). For example, the CSE may determine whether the attribute of the 'operationCheck' of the created <contentInstance> resource is indicated as TRUE. When the attribute of the 'operationCheck' is indicated by TRUE, the method may proceeds to S1505 and, in other cases, the method proceeds to S1515.

The CSE may create the additional <subscription> resource in the parent <container> resource of the <contentInstance> resource in order to transmit a result of future device control to the AE-C (S1505). The attribute of the 'notificationURI' of the corresponding <subscription> resource may be determined to the AE-C and set the attribute of the 'expirationCounter' to 1.

The CSE may generate information for mapping a request identifier of the request message received in S1501 and the <subscription> resource created according thereto (e.g., value of attribute of the 'subscription Reference').

The notification message may be transmitted to the AE-T due to the <contentInstance> resource created according to the request of the AE-C (S1506). This operation is based on the assumption of the present embodiment in that the aforementioned corresponding subscription is pre-registered. In addition, S1506 may be performed prior to or simultaneously with S1503, S1504, or S1505.

During transmission of the notification message, the notification message may include a value of the attribute of the 'content' (i.e., message for device control) of the <contentInstance> resource as the based resource and, in this case, include a value of the attribute of the 'operationCheck' indicated by TRUE as an indicator that requires ensuring of device control.

The AE-T may transmit response to the notification message to the CSE (S1507).

The AE-T may control a device of the AE-T based on the notification message received in S1505 (S1508). In this operation, actual device control may be performed.

The AE-T may make a request to the CSE for creation of the new <contentInstance> resource including a result of S1508 (i.e., result of device control) according to the indicator that requires ensuring device control indicated by the notification message received in S1505 (S1509).

The new <contentInstance> resource needs to be created as a child resource of the <container> resource of the CSE in order to signal, to the AE-C, that a resource for storing (or including) a result of S1508 is created according to subscription of S1505.

The CSE may create the <contentInstance> resource including a result of S1508 according to the resource creation request of S1509 (S1510). The CSE may transmit response to the resource creation to the AE-T (S1511).

The CSE may transmit information on the <contentInstance> resource created in response to S1509 according to the <subscription> resource created in S1505 to the AE-C via the notification message (S1512). The CSE may recognize that the <subscription> resource that creates the notification message is associated with the request identifier through the mapping information generated in S1505 and add the request identifier to the notification message. Accordingly, the AE-C may determine that the notification message is a message associated with the request message transmitted by the AE-C in S1501.

The AE-C may transmit a response message to S1511 to the CSE (S1513).

After receiving the response message, the CSE may delete the corresponding <subscription> resource because a value of the attribute of the 'expirationTime' set in the <subscription> resource created in S1504 is set to 1 (S1514).

The AE-C may determine whether content of the notification message of S1512 is the same as content of the request message of S1501 (S1515).

S1514 and S1515 may be performed simultaneously or in a reverse order.

When the content of the notification message of S1512 and the content of the request message of S1501 are the same, S1519 may be performed and, when the content of the notification message of S1512 and the content of the request message of S1501 are not the same, S1520 may be performed.

When the content of the notification message of S1512 and the content of the request message of S1501 are the same, a result of the device control may be applied (S1519). In more detail, the AE-C may recognize that the request content (i.e., content of the request message of S1501) is normally applied and, accordingly, apply a status of a related AE-T according to the content of the request message. The application may refer to change in information transmitted to an external interface by the AE-C. For example, when the AE-T is an AE of a light device and turn-on of the corresponding light device is content of the request message of S1501, the AE-T may recognize that the light device is turned on through the notification message of S1512 and may externally transmit a graphic object representing the case in which the light device is turned on. In the example of FIG. 13, the application refers to change in a status of the AE-T 1311 according to a result of device control.

When the content of the notification message of S1512 and the content of the request message of S1501 are not the same, the AE-C may recognize that there is error in processing of the request of S1501 and re-transmit the request message of S1501. That is, the method may return back to S1501.

The case in which the attribute of the 'operationCheck' included in the request message of S1501 is not TRUE will be described.

The CSE may transmit the notification message to the AE-T due to the <contentInstance> resource created according to the request of the AE-C (S1516). This operation is based on the aforementioned assumption of the present embodiment in which the corresponding subscription is pre-registered.

The notification message may include the attribute of the 'content' (i.e., content of device control message) included in the request message of S1501 and include the attribute of the 'operationCheck' indicated by TRUE. Even if the request message of S1501 includes the attribute of the 'operationCheck' indicated by TRUE, the notification message includes the attribute of the 'operationCheck' indicated by TRUE in order to ensure device control.

The AE-T may transmit the response message to S1516 to the CSE (S1517). Then, the AE-T may control a device of the AE-T based on the notification message received in S1516 (S1518).

Figure 16:
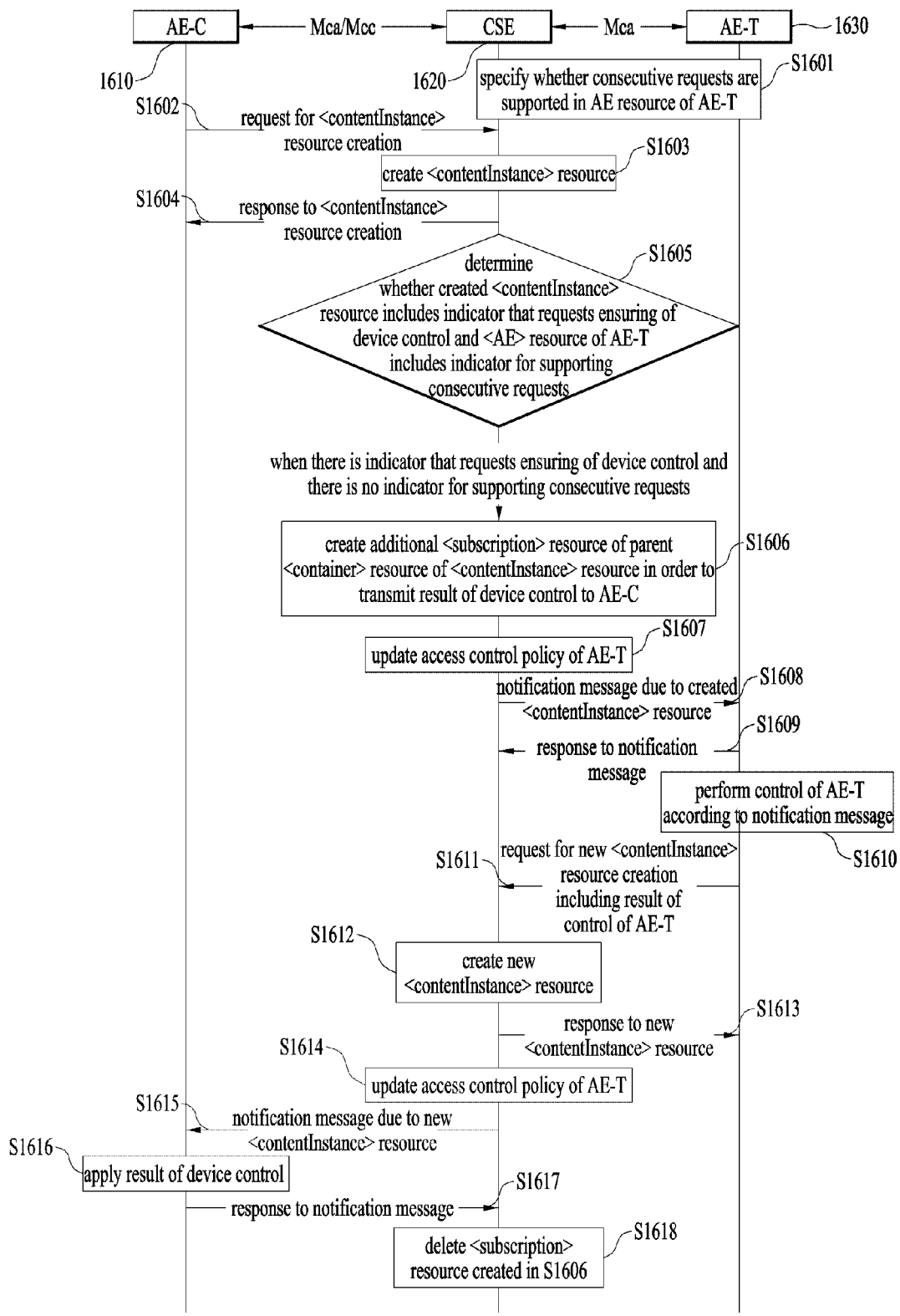
FIG. 16 illustrates a method of ensuring device control while avoiding repetition of a message for device control according to another embodiment of the present invention.

FIG. 16 illustrates a method of ensuring device control while avoiding repetition of a message for device control according to another embodiment of the present invention. This may be a solution of the case in which the simultaneous request described with reference to FIGS. 9 and 10 is generated.

In the embodiment that will be described with regard to FIG. 16, it is assumed that a control target device (i.e., target device) (or an AE-T 1630 installed or stored in a corresponding device) creates the <containter> resource in a CSE 1620 in which the device is registered and creates the <subscription> resource in order to acquire change information on the creation. In addition, the target device (or an AE installed or stored therein) may specify whether consecutive requests are supported according to hardware of the device when the device is initially registered (S1601) and this may be included in the attribute of the 'consecutiveRequestSupport' of the <AE> resource.

The following table defines the attribute of the <AE> resource.

TABLE 5

| Attributes of <AE> | Multiplicity | RW/RO/WO | Description |
| --- | --- | --- | --- |
| resourceType | 1 | RO | Refer to Table 2 |
| parentID | 1 | RO | Refer to Table 2 |
| expirationTime | 1 | RW | Refer to Table 2 |
| accessControlPolicyIDs | 0 ... 1(L) | RW | Refer to Table 2 |
| creationTime | 1 | RW | Refer to Table 2 |
| lastModifiedTime | 1 | RO | Refer to Table 2 |
| labels | 0 ... 1(L) | RO | Refer to Table 2 |
| announceTo | 0 ... 1 | RW | Refer to Table 2 |
| announceAttribute | 0 ... 1 | RW | Refer to Table 2 |
| appName | 0 ... 1 | RW | The name of the application, as declared by the application developer(e.g. "HeatingMonitoring") |
| App-ID | 1 | WO | The identifier of the Application |
| AE-ID | 1 | RO | The identifier of the Application Entity |
| pointOfAccess | 0 ... 1(L) | RW | The list of addresses for communicating with the registered Application Entity over Mca reference point via the transport services provided by Underlying Network (e.g. IP address, FQDN, URI). This attribute shall be accessible only by the AE and the Hosting CSE. If this information is not provided, the AE should use <pollingChannel> resource. Then the Hosting CSE can forward a request to the AE without using the PoA. |
| ontologyRef | 0 ... 1 | RW | Refer to Table 2 |
| nodeLink | 0 ... 1 | RO | A URI of a <node> resource that stores the node specific information. |
| consecutiveRequestSupport | 0 ... 1 | RW | Attributes indicating physical state characteristics of an apparatus. This specifies whether the apparatus can perform a normal operation event in a consecutive request or sets a corresponding value to FALSE even when the apparatus malfunctions (fire) due to an external consecutive request. |

An AE-C 1610 that intends to control the target device may transmit a request message for creation of the <contentInstance> resource including a message for control of the target device to a CSE 1620 (i.e., CSE in which an AE of the target device is registered) in which the target device is registered (S1602). The request message may include the message (value of attribute of the 'content') for device control and an indicator (value of attribute of the 'operationCheck') for ensuring of device control.

In addition, the request message may include a request identifier (Request ID) according to the request of device control.

The CSE may create the <contentInstance> resource according to the request message of S1602 (S1603).

The CSE that normally completes creation of the resource in S1603 may transmit a response message indicating that the request message and processing are normally completed to the AE-C (S1604).

Then, the CSE may check the value of the attribute of the 'operationCheck' of the <contentInstance> resource created in S1603 and the value of the attribute of the 'consecutiveRequestSupport' of the <AE-T> resource (S1605).

When the 'operationCheck'=TRUE and the 'consecutiveRequestSupport'=FALSE, the following operations may be performed.

The CSE may create the <subscription> resource in order to receive notification of the result of future device control by the AE-C (S1606). In this case, the value of the attribute of the 'notificationURI' may be determined to the AE-C and the value of the attribute of 'expirationTime' may be set to 1.

The CSE may update access control policy (ACP) attribute of the AE-T so as to access the <container> resource only by the AE-T 1630 (S1607). In this case, the CSE may be an entity with right of selfPrivilege according to settings of the AE-T.

A resource change event (i.e., creation of the <contentInstance> resource of S1603) occurs according to the pre-created <subscription> resource and, thus, the CSE may transmit the notification message about the creation to the AE-T (S1608). The notification message may include a message for control of the target device and/or a request identifier of the request message of S1602 and include the value of the attribute of the 'operationCheck' determined as TRUE.

The AE-T may transmit a response message to the notification message to the CSE (S1609). Then, the AE-T may control a device according to request of the notification message (S1610).

The attribute of the 'operationCheck' set to TRUE is included in the notification message of S1607 and, thus, the AE-T needs to report a result of device control to the CSE. That is, the AE-T may transmit the request message for generating the <contentInstance> resource of the CSE in order to report the result of device control (S1611), the parameter 'ri' of the request message is set to the request identifier received in S1608, the parameter 'content' includes the result of device control (success or failure, in detail, success in the case in which the content of the request message of S1602 is indicated without changes and, when a reverse or different result is written, the AE-C recognizes this according to a policy of a service provider), and the attribute of the 'operationCheck' may be indicated by DONE indicating that device control is terminated.

Accordingly, the CSE may create the <contentInstance> resource (S1612)

The CSE may transmit a response message to the request message to the AE-T (S1613).

The value of the attribute of the 'operationCheck' of the request message of S1611 is indicated by DONE and, thus, the CSE may recognize that device control is terminated and return the attribute of the 'accessControlPolicy' to an original attribute value (roll-back) (i.e., return to status prior to S1607) (S1614). Through this operation, another AE that is capable of accessing a resource may control the AE-T.

Since a new resource is created according to the request message of S1611, a notification creation condition according to the subscription of S1606 is satisfied and, thus, the CSE may transmit the notification message about this to the AE-C (S1615). The notification message may include the request message and the attribute of the 'operationCheck' indicated by DONE.

The 'operationCheck' is to be checked as DONE and, thus, the AE-C may check that a physical operation of device control is completed (succeeds/fails) and apply a device control result based thereon (S1616). That is, for example, the AE-C may control a UI.

The AE-C may transmit a response message to the notification message of S1615 to the CSE (S1617).

The CSE may recognize that the AE-C normally receives the notification message of S1615 and delete the <subscription> created in S1606 for one-time control (S1618).

Figure 17:
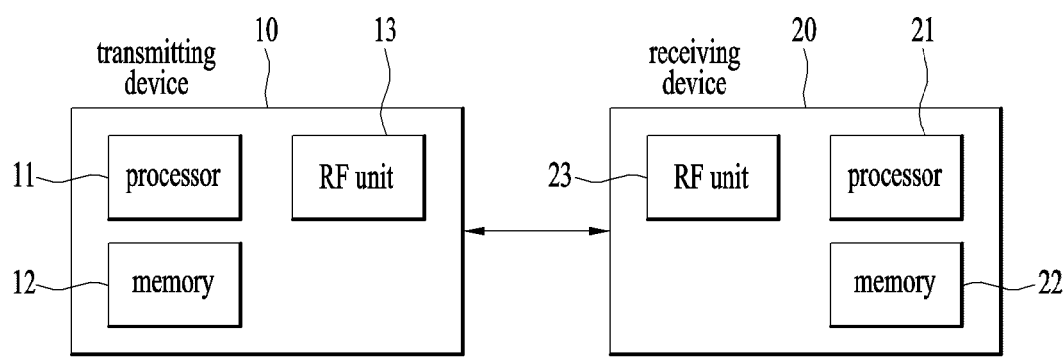
FIG. 17 is a block diagram of a device configured to execute embodiment(s) of the present invention.

FIG. 17 is a block diagram of a transmitting device 10 and a receiving device 20 configured to implement exemplary embodiments of the present invention. Referring to FIG. 17, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for ensuring processing of a control operation in a wireless communication system, the method being performed by a first machine to machine (M2M)/Internet of Things (IoT) device and comprising:
   transmitting a resource creation request for transmitting a control message instructing a control operation of a second M2M/IoT device to a third M2M/IoT device, the resource creation request including content of the control message, an indicator for requesting for ensuring processing of the control operation, or an identifier of the resource creation request;
   receiving a resource creation response in response to the resource creation request from the third M2M/IoT device;
   receiving a control result notification including a result of processing of the control operation according to the indicator from the third M2M/IoT device, the control result notification including the identifier of the resource creation request; and
   checking whether the content of the control message and content of the control result notification are the same.

2. The method according to claim 1, wherein the indicator triggers creation of a subscription resource for enabling a notification of a change in a resource related to the control operation in order to ensure processing of the control operation.

3. The method according to claim 1, further comprising applying the content of the control result notification to a status of the first M2M/IoT device when the content of the control message and the content of the control result notification are the same.

4. The method according to claim 1, further comprising retransmitting the resource creation request to the third M2M/IoT device when the content of the control message and the content of the control result notification are not the same.

5. A method for ensuring processing of a control operation in a wireless communication system, the method being performed by a first machine to machine (M2M)/Internet of Things (IoT) device and comprising:
   receiving a creation request of a resource (hereinafter, referred to as "transfer resource") for transmitting a control message instructing a control operation of a second M2M/IoT device from a third M2M/IoT device, the resource creation request including content of the control message, an indicator for requesting for ensuring of processing of the control operation, or an identifier of the resource creation request;
   creating the transfer resource according to the resource creation request;
   transmitting a resource creation response in response to the creation request of the transfer resource to the third M2M/IoT device;
   determining whether the indicator is present in the created transfer resource;
   when the indicator is present in the created transfer resource, creating a subscription resource for enabling a notification of a change in a resource related to the control operation in order to ensure processing of the control operation;
   upon receiving a creation request of a resource including a result of processing of the control operation from the second M2M/IoT device, creating the resource including the result of processing of the control operation; and
   transmitting a control result notification including the result of processing of the control operation according to the created subscription resource to the third M2M/IoT device.

6. The method according to claim 5, further comprising:
   transmitting a notification message including content of the control message or the indicator and instructing the control operation to the second M2M/IoT device according to a pre-created subscription resource; and
   receiving, from the second M2M/IoT device, a creation request of a resource including the result of processing of the control operation according to the notification message.

7. The method according to claim 5, wherein the indicator further indicates a creation request of a resource including the result of processing of the control operation to the second M2M/IoT device.

8. The method according to claim 5, wherein the creating the subscription resource further comprises mapping an identifier of the resource creation request and the subscription resource.

9. The method according to claim 5, wherein the creating the subscription resource further comprises limiting a number of the notification of the change in the resource related to the control operation to one.

10. The method according to claim 5, further comprising, upon receiving a response in response to a transmission of the notification of control result including the result of processing of the control operation from the third M2M/IoT device, deleting the created subscription resource.

11. A machine to machine (M2M)/Internet of Things (IoT) device configured to ensure processing of a control operation in a wireless communication system, the M2M/IoT device comprising:
   a radio frequency (RF) unit; and
   a processor configured to control the RF unit,
   wherein the processor is configured to transmit a resource creation request for transmitting a control message instructing a control operation of a second M2M/IoT device to a third M2M/IoT device, the resource creation request including content of the control message, an indicator for requesting for ensuring processing of the control operation, or an identifier of the resource creation request, to receive a resource creation response in response to the resource creation request from the third M2M/IoT device, to receive a control result notification including a result of processing of the control operation according to the indicator from the third M2M/IoT device, the control result notification including the identifier of the resource creation request, and to check whether the content of the control message and content of the control result notification are the same.

12. The M2M/IoT device according to claim 11, wherein the indicator triggers creation of a subscription resource for enabling notification of a change in a resource related to the control operation in order to ensure processing of the control operation.

13. The M2M/IoT device according to claim 11, wherein the processor is configured to apply the content of the control result notification to a status of the first M2M/IoT device when the content of the control message and the content of the control result notification are the same.

14. The M2M/IoT device according to claim 11, wherein the processor is configured to retransmit the resource creation request to the third M2M/IoT device when the content of the control message and the content of the control result notification are not the same.

15. A machine to machine (M2M)/Internet of Things (IoT) device configured to ensure processing of a control operation in a wireless communication system, the M2M/IoT device comprising:
- a radio frequency (RF) unit; and
- a processor configured to control the RF unit,
- wherein the processor is configured to receive a creation request of a resource (hereinafter, referred to as "transfer resource") for transmitting a control message instructing a control operation of a second M2M/IoT device from a third M2M/IoT device, the resource creation request including content of the control message, an indicator for requesting for ensuring of processing of the control operation, or an identifier of the resource creation request, to create the transfer resource according to the resource creation request, to transmit a resource creation response in response to the creation request of the transfer resource to the third M2M/IoT device, to determine whether the indicator is present in the created transfer resource, to create a subscription resource for enabling a notification of a change in a resource related to the control operation in order to ensure processing of the control operation when the indicator is present in the created transfer resource, to create the resource including the result of processing of the control operation upon receiving a creation request of a resource including a result of processing of the control operation from the second M2M/IoT device, and to transmit a control result notification including the result of processing of the control operation according to the created subscription resource to the third M2M/IoT device.

16. The M2M/IoT device according to claim 15, wherein the processor is configured to transmit a notification message including content of the control message or the indicator and instructing the control operation to the second M2M/IoT device according to a pre-created subscription resource, and to receive, from the second M2M/IoT device, a creation request of a resource including the result of processing of the control operation according to the notification message.

17. The M2M/IoT device according to claim 15, wherein the indicator further indicates a creation request of a resource including the result of processing of the control operation to the second M2M/IoT device.

18. The M2M/IoT device according to claim 15, wherein the processor is configured to map an identifier of the resource creation request and the subscription resource during creating the subscription resource.

19. The M2M/IoT device according to claim 15, wherein the processor is configured to limit a number of the notification of the change in the resource related to the control operation to one during creating the subscription resource.

20. The M2M/IoT device according to claim 15, wherein the processor is configured to delete the created subscription resource upon receiving a response in response to to a transmission of the notification of control result including the result of processing of the control operation from the third M2M/IoT device.

* * * * *